United States Patent
Wang et al.

(10) Patent No.: US 8,087,040 B2
(45) Date of Patent: Dec. 27, 2011

(54) SLOT-IN TYPE DISK DRIVE

(75) Inventors: Tai-Kuo Wang, Taipei (TW); Fu-Jen Yang, Taipei (TW); Chieh-Li Chen, Taipei (TW)

(73) Assignee: Lite-On It Corporation, Taipei (TW)

( * ) Notice: Subject to any disclaimer, the term of this patent is extended or adjusted under 35 U.S.C. 154(b) by 733 days.

(21) Appl. No.: 12/165,738

(22) Filed: Jul. 1, 2008

(65) Prior Publication Data

US 2009/0044213 A1 Feb. 12, 2009

(30) Foreign Application Priority Data

Aug. 7, 2007 (CN) .......................... 2007 1 0143265

(51) Int. Cl.
*G11B 23/00* (2006.01)
(52) U.S. Cl. ...................................... 720/719
(58) Field of Classification Search .................. 720/617, 720/619, 620, 622, 623, 719, 631, 624, 653, 720/621, 626; 360/99.06
See application file for complete search history.

(56) References Cited

U.S. PATENT DOCUMENTS

| | | | |
|---|---|---|---|
| 6,219,324 B1* | 4/2001 | Sato et al. | 720/623 |
| 2001/0001606 A1* | 5/2001 | Horie | 369/77.2 |
| 2005/0102689 A1* | 5/2005 | Saji et al. | 720/619 |

* cited by examiner

*Primary Examiner* — Mark Blouin
(74) *Attorney, Agent, or Firm* — Thomas, Kayden, Horstemeyer & Risley, LLP

(57) ABSTRACT

A disk drive includes a chassis having a spindle motor for rotating a disk and a read/write head for reading or writing data on the disk, a slide block disposed at one side of the chassis and slidable reciprocally along an entrance-and-exit route defined by the disk, and a support member mounted on the slide member so as to be movable together therewith. The support member supports the disk from below during inserting the disk into the disk drive.

5 Claims, 4 Drawing Sheets though the user can maintain an even horizontal level during the disk insertion operation, the disk 20' is subjected to incline downward due to its gravity weight, thereby tending to scratches on the surface of the disk 20'.

SLOT-IN TYPE DISK DRIVE

FIELD OF THE INVENTION

The invention relates to a disk drive, more particularly to a disk drive of slot-in type.

BACKGROUND OF THE INVENTION

FIG. 1 illustrates a prior art slot-in type disk drive to include a chassis 10', a drive motor 30', a speed reduction gear assembly 40' and a slide block 50'. The chassis 10' includes a spindle motor 11' and a read/write head 12'. The spindle motor 11' is used for rotating an optical disk 20' while the read/write head 12' is capable of reading/writing data on the disk 20'.

The speed reduction gear assembly 40' is meshed with the drive motor 30' and the slide block 50' such that activation of the drive motor 30' results in rotation of the speed reduction gear assembly 40', which, in turn, drives the slide block 50' along an entrance-and-exit route defined by the disk 20'. The slide block 50' is mounted at one side of the chassis 10' so that reciprocal sliding of the slide block 50' along the entrance-and-exit route results in upward and downward movement of the chassis 10', thereby permitting the spindle motor 11' to clamp the disk 20' or freeing the latter from the spindle motor 11'.

The prior disk drive further includes an insert-and-eject device 60' that is capable of moving the inserted disk to a reading position, where the disk will be clamped and later rotated by the spindle motor 11'. The insert-and-eject device 60' includes a plurality of guiding levers 61', 62', 63', which are activated by the slide block 50'. Upon detecting an extension of the disk 20' partially through the entrance-and-exit slot 100S', the drive motor 30' is activated. At this time, the slide block 50' is driven via the speed reduction gear assembly 40' to slide along the disk ejecting direction (i.e. toward the entrance-and-exit slot 100S), where, the guide levers 61', 62', 63' contact the periphery of the disk 20' in order to bring the disk 20' inward of the disk drive to a predetermined position above the spindle motor 11'. The disk 20' is then clamped by the spindle motor 11' due to upward and downward movement of the chassis 10' while the guide levers 61', 62', 63' simultaneously move away from the disk 20'. The disk 20' is rotated smoothly by the spindle motor 11' since being spaced apart from the guide levers 61', 62', 63'. No wearing is occurred between the disk 20' and the guide levers 61', 62', 63'.

However, during the disk inserting operation, the disk 20' is often disposed at an uneven horizontal level due to unbalance of the user's applied force. Moreover, the electronic components, such as the chassis 10' and the drive motor 30', are generally located in a lower side of the housing, frontward and downward insertion of the disk 20' with respect to the entrance-and-exit slot 100S' may result in scratches on the surface of the disk 20', thereby damaging the recorded data and unable to retrieve the data. Even if, under high precaution, the user can maintain an even horizontal level during the disk insertion operation, the disk 20' is subjected to incline downward due to its gravity weight, thereby tending to scratches on the surface of the disk 20'.

SUMMARY OF THE INVENTION

The object of the present invention is to provide an optical disk drive of slot-in type that is capable of disposing the disk at an appropriate elevation during the disk inserting/ejecting operations so as to prevent the recorded surface of the disk from being scratched.

The other object of the present invention is to provide a disk drive of slot-in type which is capable of supporting the disk during inserting and ejecting operations and preventing the surface of the disk from being scratched during the reading/writing operation.

A disk drive is provided according to the present invention and includes a chassis, a slide block, and a support member. The chassis includes a spindle motor for rotating an optical disk and a read/write head for reading or writing data on the disk. The slide block is disposed at one side of the chassis and is slidable reciprocally along an entrance-and-exit route defined by the disk. The support member is mounted on the slide block so as to be movable together therewith. The support member supports the disk from below during inserting the disk into the disk drive.

BRIEF DESCRIPTION OF THE DRAWINGS

Other features and advantages of this invention will become more apparent in the following detailed description of the preferred embodiment of this invention, with reference to the accompanying drawings, in which.

DETAILED DESCRIPTION OF THE PREFERRED EMBODIMENT

Figure 1:
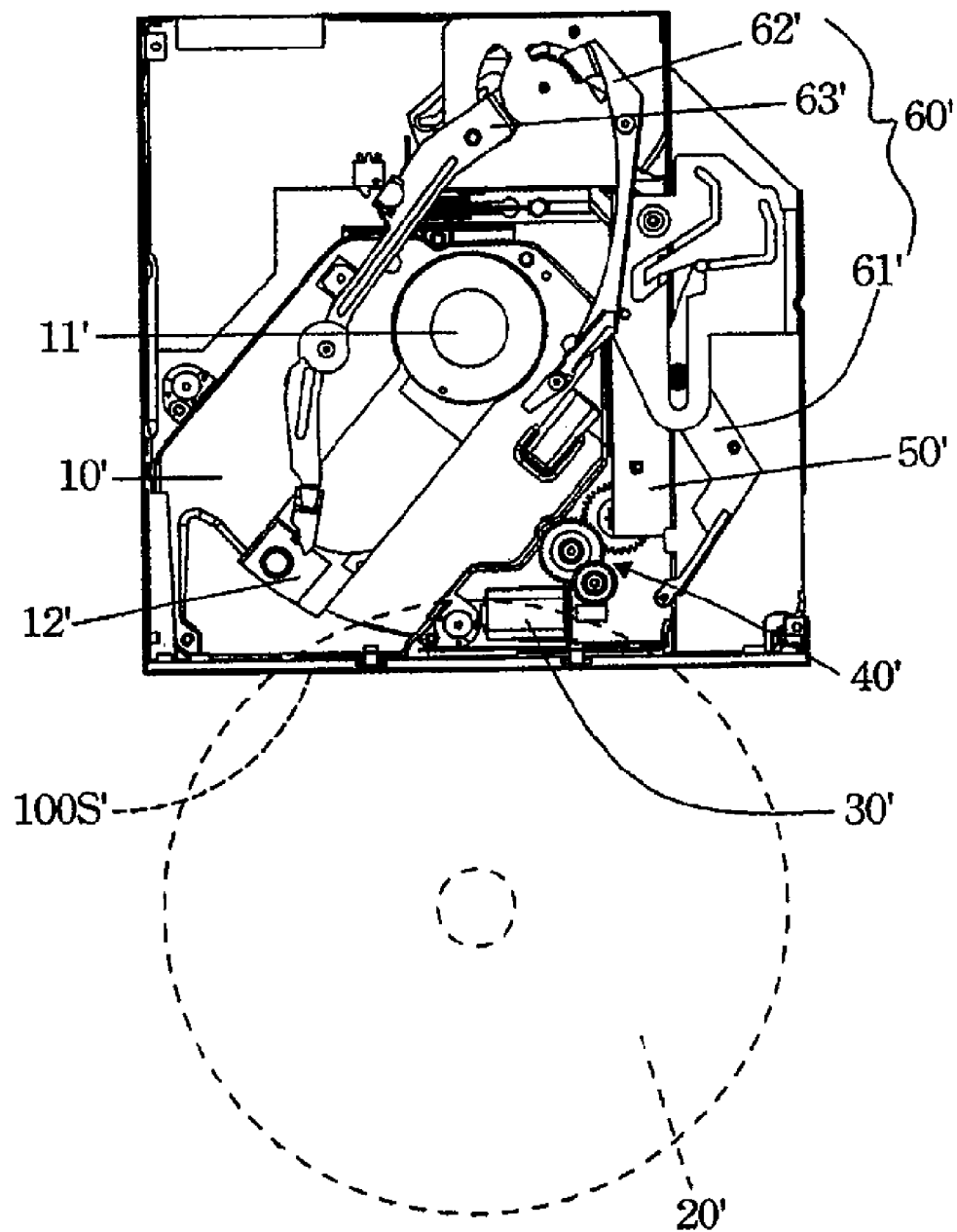
FIG. 1 illustrates a slot-in type disk drive of the prior art.
Figure 2:
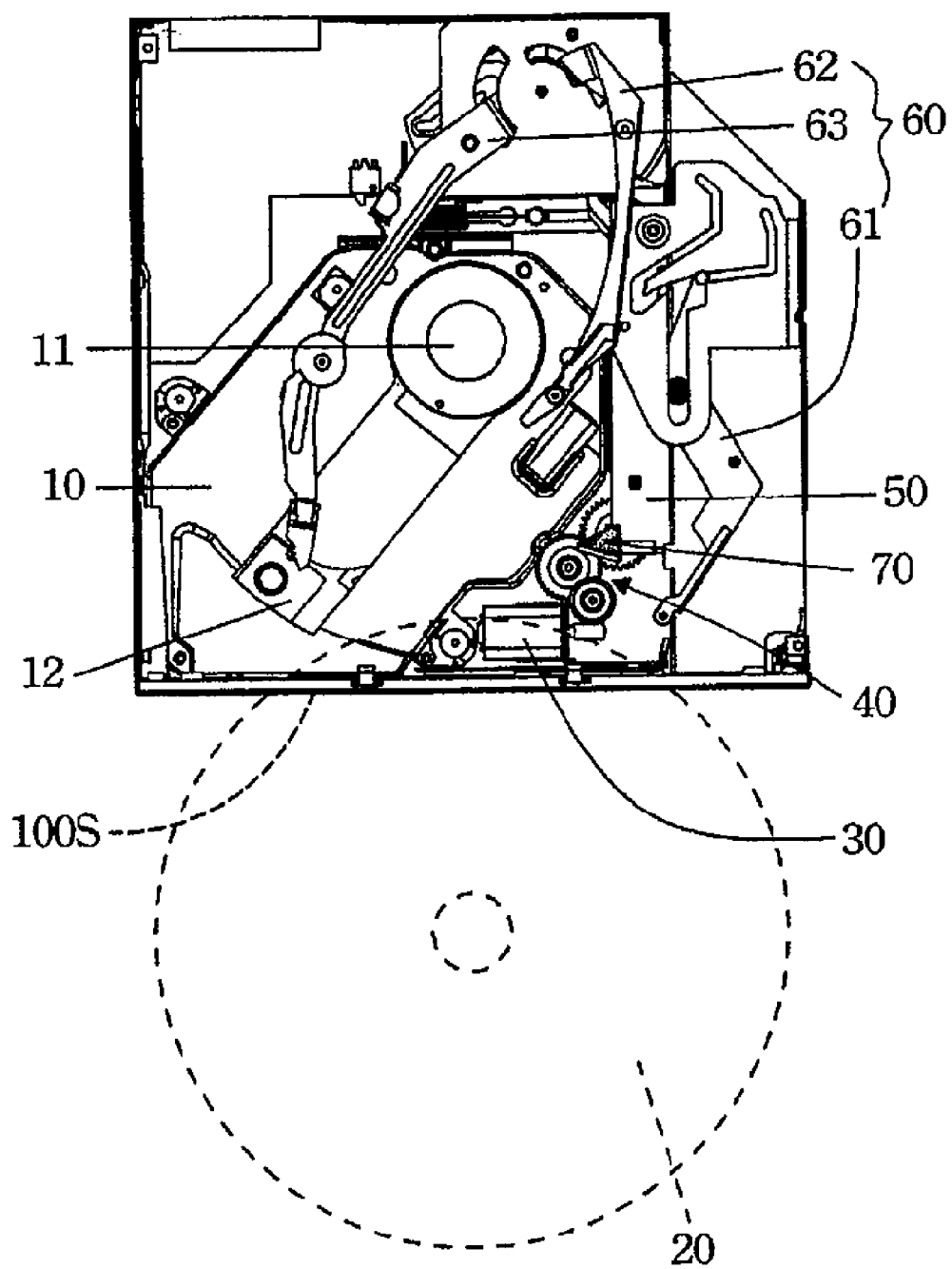
FIG. 2 illustrates a slot-in type disk drive of the present invention prior to insertion of an optical disk thereinto.

FIG. 2 illustrates the slot-in type disk drive of the present invention prior to insertion of an optical disk 20 thereinto.

The disk drive of the present invention accordingly includes a chassis 10, a drive motor 30, a speed reduction gear assembly 40, a slide block 50 and a support member 70. The chassis 10 includes a spindle motor 11 for rotating the inserted disk and a read/write head 12 for reading/writing the data on the inserted disk 20.

In this embodiment, the speed reduction gear assembly 40 is meshed with the drive motor 30 and the slide block 50 such that upon activation of the drive motor 30, the slide block 50 is driven by the speed reduction gear assembly 40 to slide reciprocally along the entrance-and-exit route of the disk. The slide block 50 is disposed at one side of the chassis 10. Reciprocally sliding of the slide block 50 along the entrance-and-exit route (toward the disk ejecting direction or toward the disk inserting direction) simultaneously results in upward and downward movement of the chassis 10, thereby causing the spindle motor 11 to clamp the inserted disk or releasing the inserted disk with respect to the spindle motor 11. The support member 70 is mounted on the front end of the slide block 50 so as to be movable together therewith.

The disk drive of the present invention further includes an insert-and-eject device 60 that is capable of moving the inserted disk to a reading position, where the disk will be clamped as mentioned above and later rotated by the spindle motor 11. Since the relevant feature of the present invention does not reside in the structure of the insert-and-eject device 60, many variations can be included and a detailed description of the same is omitted herein for the sake of brevity. The insert-and-eject device 60 includes a plurality of guide levers 61, 62, 63, which are activated by the slide block 50 when the latter slides reciprocally along the entrance-and-exit route.

Figure 3:
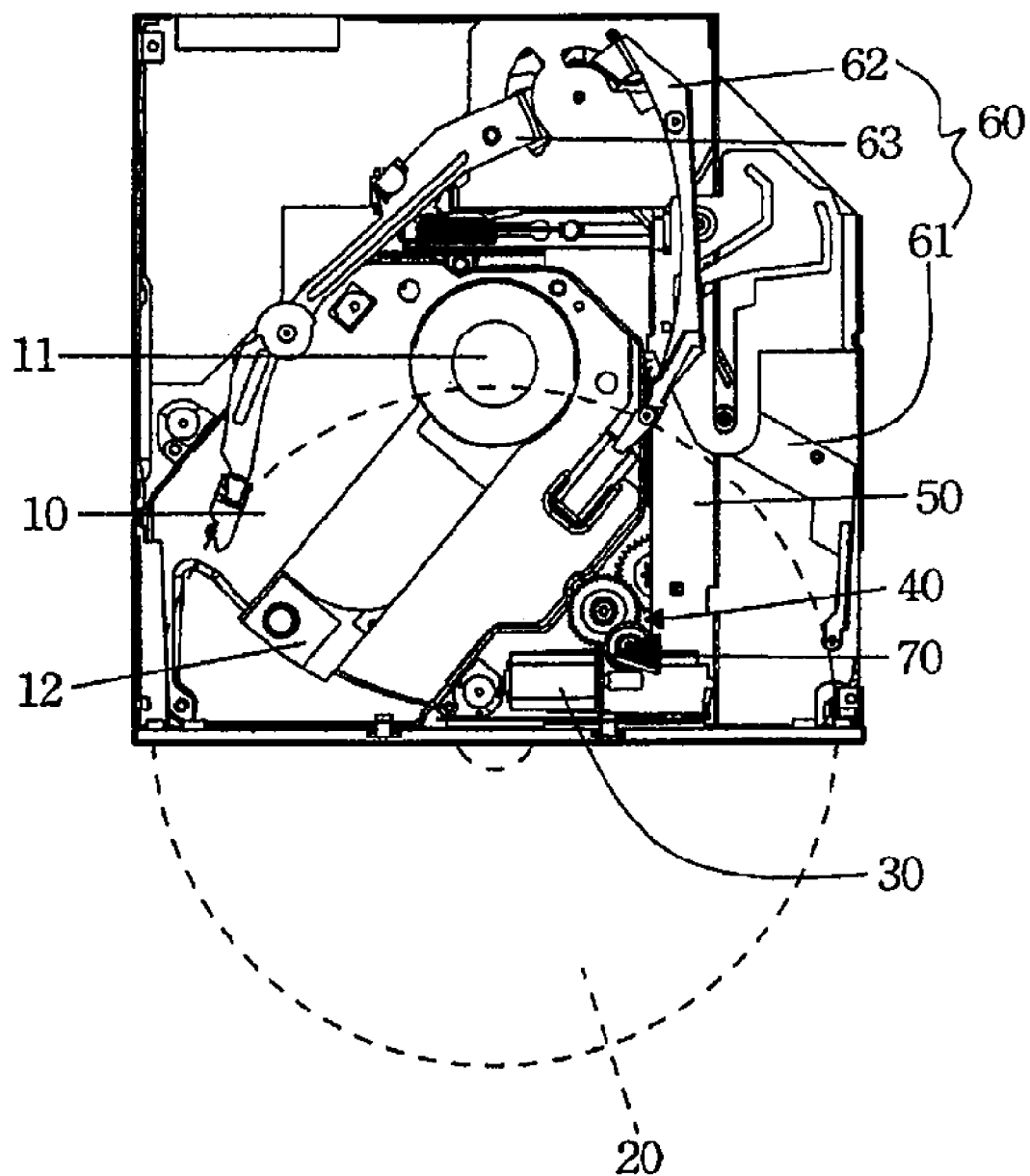
FIG. 3 shows the slot-in type disk drive of the present invention, illustrating the optical disk being guided thereinto.
Figure 4:
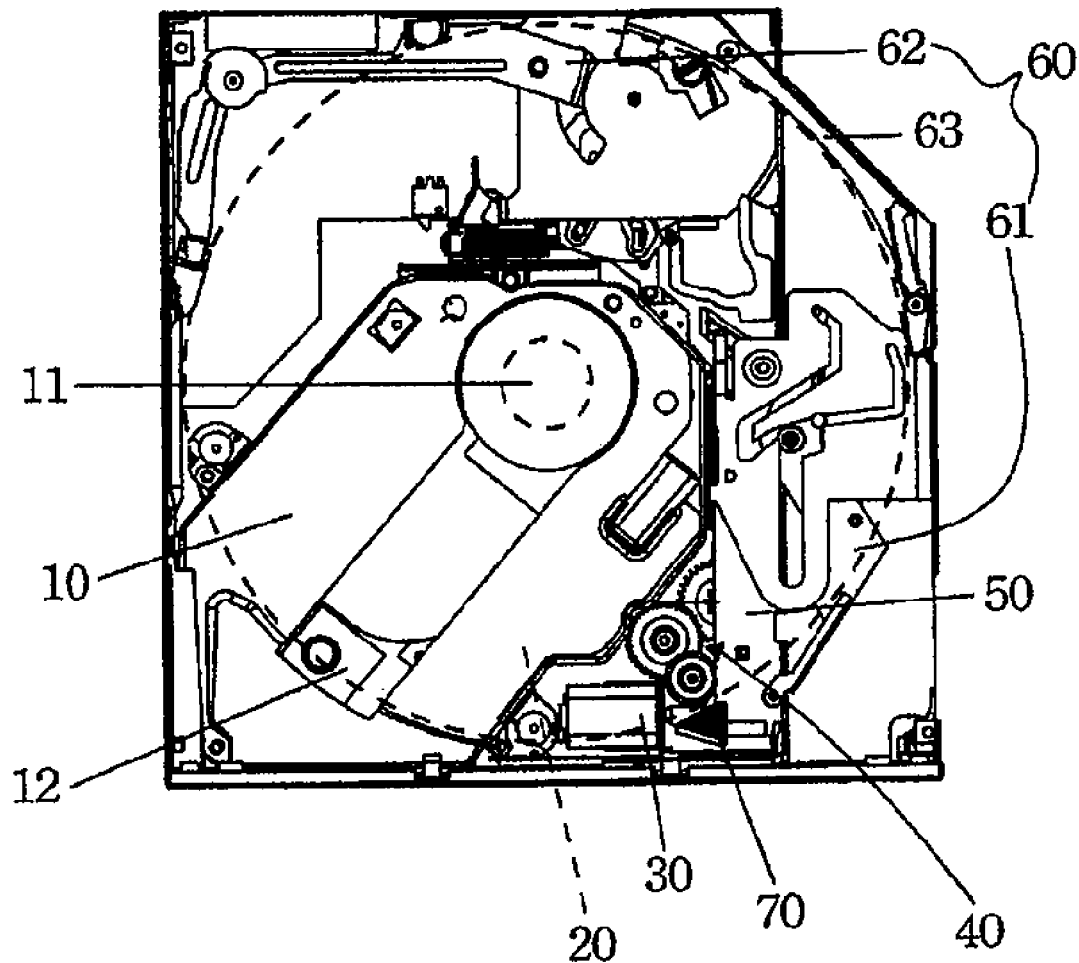
FIG. 4 shows the slot-in type disk drive of the present invention, illustrating the optical disk being fully inserted thereinto.

The detailed operation of the slot-in type disk drive of the present invention will be described below. Please refer to FIGS. 2-4. FIG. 2 illustrates the slot-in type disk drive of the present invention prior to insertion of an optical disk thereinto. FIG. 3 shows the slot-in type disk drive of the present invention, illustrating the optical disk being guided thereinto. FIG. 4 shows the slot-in type disk drive of the present invention, illustrating the optical disk being fully inserted thereinto.

The drive motor 30 is activated upon detecting a partial extension of the disk 20 through the entrance-and-exit slot 100S (see FIG. 2) of the disk drive of the present invention. At this time, the slide block 50 is driven by the speed reduction gear assembly 40 to slide along the disk ejecting direction (i.e. toward the entrance-and-exit slot 100S). The support member 70 slides together with the slide block 50 simultaneously and supports the inserted disk 20 from below, thereby retaining the disk 20 at an appropriate level relative to the electronic components located in the bottom of the housing during the disk inserting operation. Under this condition, the surface of the insert disk 20 is prevented from being scratched.

Movement of the slide block 50 along the disk ejecting direction results in activation the guide levers 61, 62,63 so that the guide levers 61, 62,63 cooperatively contact the periphery of the inserted disk 20 to guide the same inward of the disk drive to a position, as shown in FIG. 3, where the disk 20 is located right above and is clamped by the spindle motor 11 upon upward and downward movement thereof. The guide levers 61, 62, 63 moves away from the disk 20 once the disk 20 is positioned on the spindle motor 11 for rotation. Under this condition, no wearing is generated between the guide levers 61, 62,63 and the disk 20 during rotation.

Referring to FIG. 4, note that once the disk 20 is positioned on the spindle motor 11 for rotation, the slide block 50 reaches the front most end of the disk drive (i.e. adjacent to the entrance and exit slot 100S), in which, the support member 70 is located outside of a rotational periphery defined by the disk 20.

According to the present invention, since the support member 70 is located outside to the rotational periphery of the disk 20 loaded in the disk drive, the support member 70 will not contact the disk 20 when the latter is being rotated by the spindle motor. Thus, scratches will not be formed on the external surface of the disk 20.

When it is required to eject the disk from the disk drive of the present invention, the spindle motor is de-energized to stop from rotating while the drive motor 30 is activated. The slide block 50 is therefore driven by the speed reduction gear assembly 40 to slide along the disk inserting direction (i.e. away from the entrance-and-exit slot 100S). Movement of the slide block 50 along the disk inserting direction results in downward movement of the spindle motor so as to release the disk therefrom such that the disk 20 is guided by the guide levers 61, 62,63 toward the entrance-and-exit slot. The user can fetch the disk outwardly from the disk drive since the disk projects partially and outwardly from the entrance-and-exit slot.

Note that during the disk ejecting operation, the slide block 50 slides along the disk inserting direction such that the support member 70 simultaneously moves from below and supporting the disk, thereby retaining the disk 20 at an appropriate level relative to the electronic components located in the bottom of the housing. Under this condition, the surface of the insert disk 20 is prevented from being scratched.

In accordance with the present invention, during the inserting or ejection operation of the disk, the support member is located below and supports the disk so as to retain the disk 20 at an appropriate level relative to the electronic components located in the bottom of the housing. Furthermore, during rotation of the disk by the spindle motor at the reading operation, the support member 70 is located outside of the rotational periphery of the disk, thereby preventing contact between the support member 70 and the disk. Therefore, utility of the disk drive of the present invention can effectively prevent the surface of the disk from being scratched.

While the present invention has been described in connection with what is considered the most practical and preferred embodiments, it is understood that this invention is not limited to the disclosed embodiments but is intended to cover various arrangements included within the spirit and scope of the broadest interpretation so as to encompass all such modifications and equivalent arrangements.

What is claimed is:

1. A slot-in type disk drive comprising:
   an entrance-and-exit slot for inserting a disk into or ejecting the disk therefrom;
   a chassis including a spindle motor for rotating the disk and a read/write head for reading or writing data on the disk;
   a slide block disposed at one side of said chassis and slidable reciprocally along an entrance-and-exit route defined by the disk; and
   a support member mounted on the slide block so as to be movable together therewith;
   wherein, during inserting the disk into the disk drive, said slide block moves along said entrance-and-exit route toward said entrance-and-exit slot, and said support member moves under the disk and contacts the bottom of the disk for supporting the disk,
   wherein said reciprocal sliding of said slide block along said entrance-and-exit route simultaneously results in upward and downward movement of said chassis with respect to the disk, thereby disposing the disk onto said spindle motor for rotation or releasing the disk from said spindle motor.

2. The disk drive according to claim 1, further comprising:
   a drive motor; and
   a gear set meshed with said drive motor and said slide block;
   wherein, activation of said drive motor results in rotation of said gear set, which, in turn, drives said slide block to slide along said entrance-and-exit route.

3. The disk drive according to claim 1, wherein when the disk is rotated by said spindle motor, said support member is located outside of a rotational periphery defined by the disk.

4. The disk drive according to claim 1, wherein said slide block slides along said entrance-and-exit route away from said entrance-and-exit slot during ejection of the disk.

5. The disk drive according to claim 1, wherein said slide block having a front end adjacent to said entrance-and-exit slot, said support member being mounted on said front end of said slide block.

* * * * *